United States Patent
Wei et al.

(10) Patent No.: US 12,365,773 B2
(45) Date of Patent: Jul. 22, 2025

(54) METHOD FOR THE PRODUCTION OF A CONTINUOUS ELASTOMERIC FILM

(71) Applicant: Synthomer Sdn. Bhd., Johor (MY)

(72) Inventors: Zhenli Wei, Johor (MY); Yi-Fan Goh, Johor (MY)

(73) Assignee: Synthomer Sdn. Bhd., Johor Darul Takzim (MY)

( * ) Notice: Subject to any disclaimer, the term of this patent is extended or adjusted under 35 U.S.C. 154(b) by 337 days.

(21) Appl. No.: 17/768,703

(22) PCT Filed: Oct. 13, 2020

(86) PCT No.: PCT/MY2020/050103
§ 371 (c)(1),
(2) Date: Apr. 13, 2022

(87) PCT Pub. No.: WO2021/075948
PCT Pub. Date: Apr. 22, 2021

(65) Prior Publication Data
US 2024/0141117 A1    May 2, 2024

(30) Foreign Application Priority Data
Oct. 18, 2019  (MY) .......................... PI 2019006181

(51) Int. Cl.
*C08J 5/18*  (2006.01)
(52) U.S. Cl.
CPC ............. *C08J 5/18* (2013.01); *C08J 2313/02* (2013.01)
(58) Field of Classification Search
CPC .... A41D 19/0068; A61D 42/00; A61D 42/10; C08J 5/18; C08J 2309/04; C08J 2309/08; C08J 2309/10; C08J 2313/02
See application file for complete search history.

(56) References Cited

U.S. PATENT DOCUMENTS

| | | | |
|---|---|---|---|
| 5,750,618 A | 5/1998 | Vogt et al. | |
| 2006/0047098 A1 | 5/2006 | Anna et al. | |
| 2010/0036041 A1 | 2/2010 | Schroeder et al. | |
| 2012/0054943 A1 | 3/2012 | Tao | |
| 2014/0090148 A1 | 4/2014 | Tao | |
| 2015/0047097 A1 | 2/2015 | Tao | |
| 2019/0092891 A1 | 3/2019 | Kells et al. | |

FOREIGN PATENT DOCUMENTS

| | | | | |
|---|---|---|---|---|
| EP | 792891 A1 | 9/1997 | | |
| WO | 2004028772 A1 | 4/2004 | | |
| WO | 2016018956 A1 | 2/2016 | | |
| WO | WO-2017126660 A1 * | 7/2017 | ............. | A41D 19/00 |
| WO | 2017209596 A1 | 12/2017 | | |

OTHER PUBLICATIONS

WO 2017/126660 Machine Translation (Year: 2017).*
Malaysian Substantive Examination and Search Report issued Jan. 27, 2025, by the Intellectual Property Corporation of Malaysia in corresponding Malaysian Application No. PI2019006181. (5 pages).
International Search Report and Written Opinion for International Application PCT/MY2020/050103, dated Feb. 11, 2021, 8 pages.
Office Action issued Dec. 12, 2024, by the Taiwanese Patent Office in corresponding Taiwanese Patent Application No. 109135927 and an English translation of the Search Report. (8 pages).

* cited by examiner

*Primary Examiner* — Zachary M Davis
(74) *Attorney, Agent, or Firm* — Buchanan Ingersoll & Rooney PC

(57) ABSTRACT

The present invention relates to method for the production of a continuous elastomeric film and to continuous elastomeric films and elastomeric articles obtained thereby, where the method comprises:
- B) providing an aqueous polymer latex composition comprising:
  - (I) particles of a latex polymer obtained by free-radical emulsion polymerization of a mixture of ethylenically unsaturated monomers, the particles bearing a plurality of functional groups, and
  - (II) a crosslinking component comprising a plurality of functional groups at least one thereof being reactive with the functional groups on the latex polymer particles;
- B) forming from the aqueous polymer latex composition a continuous polymer film;
- C) optionally drying the continuous polymer film obtained in step B);
- D) curing the continuous polymer film obtained in step B) or C) to form a continuous elastomeric film; and
- E) optionally rolling the continuous elastomeric film obtained in step D) into a roll.

17 Claims, No Drawings

METHOD FOR THE PRODUCTION OF A CONTINUOUS ELASTOMERIC FILM

CROSS-REFERENCE TO RELATED APPLICATION

This application is a National Phase application of International Application No. PCT/MY2020/050103, filed Oct. 13, 2020 which claims priority to and the benefit of Malaysian Application No. PI 2019006181, filed Oct. 18, 2019, the entire disclosure of each of which is incorporated herein by reference for all purposes.

FIELD OF THE INVENTION

The present invention relates according to one aspect to a method for the production of a continuous elastomeric film and to a continuous elastomeric film obtainable thereby. According to another aspect, the present invention relates to a process for making an elastomeric article from said continuous elastomeric film and to an article obtainable thereby.

BACKGROUND OF THE INVENTION

According to the present industry standard, elastomeric films, in particular in dip-molding applications, for example examination gloves, are made from compounds containing carboxylated acrylonitrile butadiene latices (XNBR). In order to obtain the required mechanical strength for the purpose of use of these elastomeric films, some crosslinking of the films during the manufacturing of the elastomeric films needs to be achieved.

Several different concepts are available in the prior art in order to obtain such crosslinked elastomeric films. One possibility is that the compound for making the elastomeric films contains a conventional sulfur vulcanization system such as sulfur in combination with accelerators, such as thiurams and carbamates and zinc oxide.

An advanced technology avoiding sulfur vulcanization and its disadvantages is known from WO 2017/209596 disclosing a polymer latex for dip-molding applications comprising two different types of latex particles. One kind of latex particles is carboxylated whereas the second kind of latex particles contains oxirane-functional groups.

A severe disadvantage of producing elastomeric films and articles in a dip-molding process is that in the process large amounts of waste water will be produced that need to be treated. Furthermore, energy consumption is high. In the normal supply chain of the standard dip-molding technology nitrile latex containing around 55 wt.-% water is delivered from the latex producer to, for example, the glove producers. Thus, water considerably contributes to transport costs and energy consumption in transport. In the dip-molding process additional large amounts of water are added to reduce the concentration of the compounded latex used for dip-molding. As a consequence, large amounts of waste water are produced in the dip-molding process that need to be treated to comply with increasingly stringent regulations to protect the environment. Besides the above-discussed cost and environmental issues, a dip-molding process requires a stable water supply. Any water shortage will cause the manufacturer cease production.

In addition, the dipping process is a wet process where hundreds of heavy ceramic formers need to be transported along the processing lines and need to be heated and maintained at relatively high temperatures, contributing to a high energy consumption of the process. The dipping lines commercially used also occupy a lot of space.

US 2012/0054943, US 2014/0090148 and US 2015/0047097 disclose a cutting and sealing process for making gloves, wherein two halves of appropriate shape are cut out of a continuous polymeric film material and then the two halves are sealed around the edges to provide the final glove. In order to do so the polymeric material needs to be thermoplastic in nature and therefore materials like polyvinyl chloride, polystyrene, polyurethane, polybutene, styrene butadiene/isoprene copolymers and ethylene propylene copolymers are used.

Thus, there is a need in the industry for a process for making elastomeric articles that overcomes the above-described disadvantages of the standard dip-molding technology, while still employing elastomeric films based on latex technology.

SUMMARY OF THE INVENTION

According to one aspect, the present invention relates to a method for the production of a continuous elastomeric film comprising:

A) providing an aqueous polymer latex composition comprising:
  (I) particles of a latex polymer obtainable by free-radical emulsion polymerization of a mixture of ethylenically unsaturated monomers, said particles bearing a plurality of functional groups, and
  (II) a crosslinking component comprising a plurality of functional groups at least one thereof being reactive with the functional groups on the latex polymer particles;
B) forming from the aqueous polymer latex composition a continuous polymer film;
C) optionally drying the continuous polymer film obtained in step B);
D) curing the continuous polymer film obtained in step B) or C) to form a continuous elastomeric film; and
E) optionally rolling the continuous elastomeric film obtained in step D) into a roll, wherein the cured film comprises thermally reversible linkages selected from one or more of (i) a linkage having the structural formula

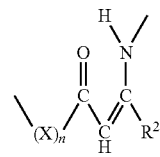

wherein X is —O— or —NR$^1$—,
  n is 0 or 1,
  R$^1$ is hydrogen or a hydrocarbyl group, and
  R$^2$ is a hydrocarbyl group; and
(ii) a beta-hydroxy ester linkage and to a continuous elastomeric film obtainable thereby.

According to another aspect, the present invention relates to process for making an elastomeric article by
  aligning two separate continuous elastomeric films as defined above;
  cutting the aligned continuous elastomeric films into a preselected shape to obtain two superposed layers of the elastomeric films in the preselected shape; and joining together the superposed layers of elastomeric film at at least a preselected part of the periphery of the superposed layers to form an elastomeric article and to an article obtainable thereby.

DETAILED DESCRIPTION OF THE INVENTION

The polymer latex composition to be used in the method for the production of a continuous elastomeric film according to the present invention may by selected from aqueous polymer latex compositions comprising:
(I) particles of a latex polymer obtainable by free-radical emulsion polymerization of a mixture of ethylenically unsaturated monomers, said particles bearing a plurality of functional groups (a), and
(II) a crosslinking component comprising a plurality of functional groups selected from functional groups (b) or a combination of functional groups (b) and (c) that are different from each other, wherein
functional group (b) forms upon reaction with functional group (a) a thermally reversible linkage selected from one or more of
(i) a linkage having the structural formula

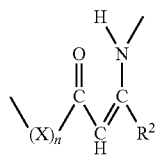

wherein X is —O— or —NR$^1$—,
n is 0 or 1,
R$^1$ is hydrogen or a hydrocarbyl group, and
R$^2$ is a hydrocarbyl group;
and
(ii) a beta-hydroxy ester linkage; and
functional groups (c) on different molecules of component (II) are capable of reacting with each other.

Latex Polymer (I)

According to the present invention, the mixture of ethylenically unsaturated monomers for preparing the latex polymer (I) may comprise
a) 15 to 99 wt.-% of conjugated dienes;
b) 1 to 80 wt.-% of ethylenically unsaturated nitrile compounds;
c) 0.05 to 10 wt.-% of ethylenically unsaturated compounds bearing functional groups (a);
d) 0 to 80 wt.-% of vinyl aromatic monomers; and
e) 0 to 65 wt.-% of co-polymerizable ethylenically unsaturated compounds, wherein monomers a) to e) are different from each other and the weight percentages being based on the total monomers in the mixture.

In the mixture of ethylenically unsaturated monomers, additional ethylenically unsaturated monomers may be present that are selected from
hydroxyalkyl esters of ethylenically unsaturated acids;
amides of ethylenically unsaturated acids;
vinyl carboxylates;
monomers having at least two ethylenically unsaturated groups;
ethylenically unsaturated silanes;
oxirane-functional ethylenically unsaturated compounds; and
combinations thereof.

Conjugated diene monomers suitable for the preparation of latex polymer (I) according to the present invention include conjugated diene monomers, selected from 1,3-butadiene, isoprene, 2,3-dimethyl-1,3-butadiene, 2,3-diethyl-1,3-butadiene, 2-chloro-1,3-butadiene, 1,3-pentadiene, 1,3-hexadiene, 2,4-hexadiene, 1,3-octadiene, 2-methyl-1,3-pentadiene, 2,3-dimethyl-1,3-pentadiene, 3,4-dimethyl-1,3-hexadiene, 2,3-diethyl-1,3-butadiene, 4,5-diethyl-1,3-octadiene, 3-butyl-1,3-octadiene, 3,7-dimethyl-1,3,6-octatriene, 2-methyl-6-methylene-1,7-octadiene, 7-methyl-3-methylene-1,6-octadiene, 1,3,7-octatriene, 2-ethyl-1,3-butadiene, 2-amyl-1,3-butadiene, 3,7-dimethyl-1,3,7-octatriene, 3,7-dimethyl-1,3,6-octatriene, 3,7,11-trimethyl-1,3,6,10-dodecatetraene, 7,11-dimethyl-3-methylene-1,6,10-dodecatriene, 2,6-dimethyl-2,4,6-octatriene, 2-phenyl-1,3-butadiene and 2-methyl-3-isopropyl-1,3-butadiene, 1,3-cyclohexadiene, myrcene, ocimene, and farnesene. 1,3-butadiene, isoprene and combinations thereof are the preferred conjugated dienes. 1,3-butadiene is the most preferred diene. Typically, the amount of conjugated diene monomer ranges from 15 to 99 wt.-%, preferably from 20 to 99 wt.-%, more preferred from 30 to 75 wt.-%, most preferred from 40 to 70 wt.-%, based on the total weight of monomers. Thus, the conjugated diene may be present in amounts of at least 15 wt.-%, at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 36 wt.-%, at least 38 wt.-%, or at least 40 wt.-%, based on the total weight of the ethylenically unsaturated monomers for latex polymer (a).

Accordingly, the conjugated diene monomers can be used in amounts of no more than 95 wt.-%, no more than 90 wt.-%, no more than 85 wt.-%, no more than 80 wt.-%, no more than 78 wt.-%, no more than 76 wt.-%, no more than 74 wt.-%, no more than 72 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, or no more than 56 wt.-%. A person skilled in the art will appreciate that any range between any of the explicitly disclosed lower and upper limits is herein disclosed.

Unsaturated nitrile monomers which can be used to make the particles of latex polymer (a) include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile, alpha-cyanoethyl acrylonitrile, fumaronitrile and combinations thereof, with acrylonitrile being most preferred. These nitrile monomers can be included in amounts from 1 to 80 wt.-%, preferably from 10 to 70 wt.-%, or 1 to 60 wt.-%, and more preferred from 15 to 50 wt.-%, even more preferred from 20 to 50 wt.-%, most preferred from 23 to 43 wt.-%, based on the total weight of ethylenically unsaturated monomers for latex polymer (a).

Thus, the unsaturated nitrile may be present in amounts of at least 1 wt.-%, 5 wt.-%, at least 10 wt.-%, at least 12 wt.-%, at least 14 wt.-%, at least 16 wt.-%, at least 18 wt.-%, at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 36 wt.-%, at least 38 wt.-%, or at least 40 wt.-%, based on the total weight of the ethylenically unsaturated monomers for latex polymer (a).

Accordingly, the unsaturated nitrile monomers can be used in amounts of no more than 80 wt.-%, no more than 75 wt.-%, no more than 73 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, no more than 56 wt.-%, no more than 54 wt.-%, no more than 52 wt.-%, no more than 50 wt.-%, no more than 48 wt.-%, no more than 46 wt.-%, or no more than 44 wt.-%. A person skilled in the art will appreciate that any range between any of the explicitly disclosed lower and upper limits is herein disclosed.

The ethylenically unsaturated compounds bearing functional group (a) may be selected from
  ethylenically unsaturated compounds bearing a functional group having the structure:

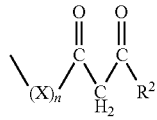

wherein X, n, $R^1$ and $R^2$ are defined as above, preferably selected from ethylenically unsaturated dione monomers and acetoacetoxy monomers and combinations thereof;
  ethylenically unsaturated compounds having a primary amino group;
  ethylenically unsaturated oxirane compounds;
  ethylenically unsaturated carboxylic acids and salts thereof;
  ethylenically unsaturated polycarboxylic acid anhydride;
  polycarboxylic acid partial ester monomers and salts thereof.

Suitable ethylenically unsaturated dione monomers may be selected from 2-(acryloyloxy)ethyl acetoacetate, 2-(methacryloyloxy)ethyl acetoacetate or vinyl acetoacetate (ethenyl 3-oxobutanoate).

Suitable ethylenically unsaturated compounds having a primary amino group may be selected from acrylamide, methacrylamide, 2-aminoethyl methacrylate and its hydro salts, N-(2-aminoethyl) methacrylamide and its hydro salts, N-(3-aminopropyl) methacrylamide and its hydro salts, allylamine and its hydro salts and methacryloyl-L-lysine and combinations thereof.

Suitable ethylenically unsaturated oxirane compounds may be selected from glycidyl (meth)acrylate, allyl glycidyl ether, vinyl glycidyl ether, vinyl cyclohexene oxide, limonene oxide, 2-ethylglycidyl acrylate, 2-ethylglycidylmethacrylate, 2-(n-propyl)glycidyl acrylate, 2-(n-propyl)glycidyl (meth)acrylate, 2-(n-butyl)glycidyl (meth)acrylate, 2-(n-butyl)glycidyl (meth)acrylate, glycidyl methyl methacrylate, glycidyl acrylate, (3',4'-epoxyheptyl)-2-ethyl acrylate, (3',4'-epoxyheptyl)-2-ethyl methacrylate, (6',7'-epoxyheptyl) acrylate, (6',7'-epoxyheptyl) methacrylate, (3-methyloxiran-2-yl) methyl 2-methacrylate, dimethyl glycidyl (meth)acrylate, 2,3-epoxybutyl (meth)acrylate, allyl-3,4-epoxyheptylether, 6,7-epoxyheptylallylether, vinyl-3,4-epoxyheptylether, 3,4-epoxyheptylvinylether, 6,7-epoxyheptylvinylether, o-vinyl benzyl glycidyl ether, m-vinyl benzyl glycidyl ether, p-vinyl benzyl glycidyl ether, 3-vinyl cyclohexene oxide, alpha-methyl glycidyl methacrylate, 3,4-epoxycyclohexylmethyl (meth)acrylate, and combinations thereof. Glycidyl (meth)acrylate is particularly preferred.

The ethylenically unsaturated carboxylic acids or salts thereof may be selected from monocarboxylic acid and dicarboxylic acid monomers and their anhydrides and partial esters of polycarboxylic acids. Carrying out the present invention, it is preferable to use ethylenically unsaturated aliphatic mono- or dicarboxylic acids or anhydrides which contain from 3 to 5 carbon atoms. Examples of monocarboxylic acid monomers include acrylic acid, methacrylic acid, crotonic acid, sipomers (monomers or oligomers) and examples of dicarboxylic acid monomers include fumaric acid, itaconic acid, maleic acid, cis-cyclohexene-1,2-dicarboxylic acid, dimethylmaleic acid, bromomaleic acid, 2,3-dichloromaleic acid and (2-dodecen-1-yl) succinic acid. Examples of polycarboxylic acid partial esters include monomethyl maleate, monomethyl fumarate, monoethyl maleate, monoethyl fumarate, monopropyl maleate, monopropyl fumarate, monobutyl maleate, monobutyl fumarate, mono(2-ethyl hexyl) maleate, mono(2-ethyl hexyl) fumarate. Examples of other suitable ethylenically unsaturated acids include vinyl acetic acid, vinyl lactic acid, vinyl sulfonic acid, 2-methyl-2-propene-1-sulfonic acid, styrene sulfonic acid, acrylamidomethyl propane sulfonic acid and the salts thereof. (Meth)acrylic acid, crotonic acid, itaconic acid, maleic acid, fumaric acid and combinations thereof are particularly preferred.

Typically, the amount of the ethylenically unsaturated compounds bearing functional groups (a) is from 0.05 to 10 wt.-%, particularly from 0.1 to 10 wt.-% or 0.05 to 7 wt.-%, preferably from 0.1 to 9 wt.-%, more preferred from 0.1 to 8 wt.-%, even more preferred from 1 to 7 wt.-%, most preferred 2 to 7 wt.-%, based on the total weight of the ethylenically unsaturated monomers for latex polymer (I). Thus, the ethylenically unsaturated compounds bearing functional groups (a) may be present in amounts of at least 0.01 wt.-%, at least 0.05 wt.-%, at least 0.1 wt.-%, at least 0.3 wt.-%, at least 0.5 wt.-%, at least 0.7 wt.-%, at least 0.9 wt.-%, at least 1 wt.-%, at least 1.2 wt.-%, at least 1.4 wt.-%, at least 1.6 wt.-%, at least 1.8 wt.-%, at least 2 wt.-%, at least 2.5 wt.-%, or at least 3 wt.-%. Likewise, the ethylenically unsaturated compounds bearing functional groups (a) may be present in amounts of no more than 10 wt.-%, no more than 9.5 wt.-%, no more than 9 wt.-%, no more than 8.5 wt.-%, no more than 8 wt.-%, no more than 7.5 wt.-%, no more than 7 wt.-%, no more than 6.5 wt.-%, no more than 6 wt.-%, no more than 5.5 wt.-%, or no more than 5 wt.-%, based on the total weight of ethylenically unsaturated monomers for latex polymer (I). A person skilled in the art will appreciate that any range defined by an explicitly disclosed lower limit and an explicitly disclosed upper limit is disclosed herewith.

According to the present invention, it is particularly preferred that the latex particles exhibit a gradient of the concentration of the functional group (a) with a higher concentration of functional groups (a) at the surface of the particles and a lower concentration within the bulk of the particles.

Representatives of vinyl-aromatic monomers include, for example, styrene, α-methylstyrene, vinyltoluene, o-methylstyrene, p-methylstyrene, p-tert-butylstyrene, 2,4-dimethylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, vinylnaphthalene, vinyltoluene and vinylxylene, 2-vinylpyridine, 4-vinylpyridine and 1,1-diphenylethylenes and substituted 1,1-diphenylethylenes, 1,2-diphenylethene and substituted 1,2-diphenylethylenes. Mixtures of one or more of the vinyl-aromatic compounds may also be used. The preferred monomers are styrene and α-methylstyrene. The vinyl-aromatic compounds can be used in a range of from 0 to 80 wt.-%, preferably from 0 to 70 wt.-%, more preferred from 0 to 50 wt.-%, even more preferred from 0 to 25 wt.-%, even more preferred from 0 to 15 wt.-%, and most preferred from 0 to 10 wt.-%, based on the total weight of ethylenically unsaturated monomers for latex polymer (I). Thus, the vinyl-aromatic compound can be present in an amount of no more than 80 wt.-%, no more than 75 wt.-%, no more than 70 wt.-%, no more than 65 wt.-%, no more than 60 wt.-%, no more than 55 wt.-%, no more than 50 wt.-%, no more than 45 wt.-%, no more than 40 wt.-%, no more than 35 wt.-%, no more than 30 wt.-%, no more than 25 wt.-%, no more than 20 wt.-%, no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (I). Vinyl-aromatic compounds may also be completely absent.

Further, the mixture of ethylenically unsaturated monomers for latex polymer (I) according to the present invention may include additional ethylenically unsaturated monomers that are different from the above-defined monomers. These monomers may be selected from e1) alkyl esters of ethylenically unsaturated acids;
- e2) hydroxyalkyl esters of ethylenically unsaturated acids;
- e3) amides of ethylenically unsaturated acids;
- e4) vinyl carboxylates;
- e5) alkoxyalkyl esters of ethylenically unsaturated acids; and combinations thereof.

Vinyl carboxylate monomers which can be used according to the present invention include vinyl acetate, vinyl proprionate, vinyl butyrate, vinyl benzoate, vinyl-2-ethylhexanoate, vinyl stearate, and the vinyl esters of versatic acid. The most preferred vinyl ester monomer for use in the present invention is vinyl acetate. Typically, the vinyl ester monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (I).

Alkyl esters of ethylenically unsaturated acids that can be used according to the present invention include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pivalic acid and hydroxyalkyl (meth)acrylate and alkoxyalkyl (meth)acrylate monomers.

In general, the preferred alkyl esters of (meth)acrylic acids may be selected from $C_1$-$C_{10}$ alkyl (meth)acrylate, preferably $C_1$-$C_8$-alkyl (meth)acrylates. Examples of such acrylate monomers include n-butyl acrylate, secondary butyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. Methyl (meth)acrylate, ethyl (meth)acrylate, propyl (meth)acrylate, butyl (meth)acrylate, 2-ethylhexyl (meth)acrylate and combinations thereof are preferred.

Typically, the alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (I).

The hydroxyalkyl esters of ethylenically unsaturated acids which can be used to prepare the polymer latex according to the present invention include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Preferably, the hydroxy alkyl(meth)acrylate monomer is 2-hydroxy ethyl(meth)acrylate. Typically, hydroxy alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (I).

Alkoxyalkyl (meth)acrylate monomers which can be used in the present invention include methoxyethyl methacrylate, ethoxyethyl methacrylate, methoxyethyl methacrylate, ethoxyethyl acrylate, butoxyethyl methacrylate, methoxybutyl acrylate and methoxyethoxyethyl acrylate. Preferred alkoxyalkyl(meth)acrylate monomers are ethoxyethyl acrylate and methoxyethyl acrylate. Typically, the amount of alkoxyethyl alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (I).

Amides of ethylenically unsaturated acids that can be used for the preparation of the polymer latex according to the present invention include acrylamide, methacrylamide, and diacetone acrylamide. The preferred amide monomer is (meth)acrylamide. In order to introduce functional groups that are capable of self-crosslinking upon heat treatment into the polymer particles of the present invention monomers comprising N-methylol amide groups may be employed. Suitable monomers are N-methylol (meth)acrylamide, N-methoxymethyl-(meth)acrylamide, N-n-butoxy-methyl-(meth)acrylamide, N-iso-butoxy-methyl-(meth)acrylamide, N-acetoxymethyl-(meth)acrylamide, N(-2,2-dimethoxy-1-hydroxyethyl) acrylamide. Typically, amides of ethylenically unsaturated acid can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (I).

The mixture of ethylenically unsaturated monomers for the latex polymer (I) may comprise:
- a) 20 to 99 wt.-% of conjugated dienes, preferably selected from butadiene, isoprene and combinations thereof, more preferred butadiene;
- b) 1 to 60 wt.-% of monomers selected from ethylenically unsaturated nitrile compounds, preferably acrylonitrile;
- c) 0.05 to 7 wt.-% of ethylenically unsaturated acids, preferably (meth)acrylic acid;
- d) 0 to 40 wt.-% of vinyl aromatic monomers, preferably styrene;
- e1) 0 to 25 wt.-% of $C_1$ to $C_8$ alkyl (meth)acrylates;

e3) 0 to 10 wt.-% of ethylenically unsaturated compounds bearing amide groups,
e4) 0 to 10 wt.-% of vinyl esters:
the weight percentages being based on the total monomers in the mixture.

According to the present invention, the amounts of the above-defined monomers for the preparation of latex polymer (I) may add up to 100 wt.-%.

According to the present invention, the mixture of ethylenically unsaturated monomers to be polymerized in the free-radical emulsion polymerization may also comprise:
(a) 15 to 90 wt.-% of isoprene;
(b) 1 to 80 wt.-% of acrylonitrile;
(c) 0.01 to 10 wt.-%, preferably 0.05 to 10 wt.-% of at least one ethylenically unsaturated acid;
(d) 0 to 40 wt.-% of at least one aromatic vinyl compound, and
(e) 0 to 20 wt.-% of at least one further ethylenically unsaturated compound different from any of compounds (a) to (d). The ranges for component (a) and/or (b) may be selected from the ranges for (a) conjugated dienes and (b) unsaturated nitrile as disclosed above. Likewise, specific embodiments and amounts for the components (c), (d) and/or (e) may be selected from those as described above for components (c), (d) and the additional polymers.

The latex polymer (I) may have a gel content of less than 70 wt.-%, preferably less than 60 wt.-%, more preferred less than 50 wt.-%, most preferred less than 40 wt.-%. The gel content as disclosed throughout the present application is measured as described in the experimental part.

Method for the Preparation of the Polymer Latex (I) Suitable for the Present Invention:

The latex polymer (I) according to the present invention can be made by any emulsion polymerization process known to a person skilled in the art, provided that the monomer mixture as herein defined is employed. Particularly suitable is the process as described in EP-A 792 891.

In the emulsion polymerization for preparing the latex polymer (I) of the present invention a seed latex may be employed. The seed latex is preferably separately prepared and the emulsion polymerization is conducted in the presence of the separately prepared seed latex. The seed latex particles are preferably present in an amount of 0.01 to 10, preferably 1 to 5 parts by weight, based on 100 parts by weight of total ethylenically unsaturated monomers employed in the polymer latex, including those for making the seed particles, such as the oxirane-functional latex particles (b). The lower limit of the amount of seed latex particles therefore can be 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 parts by weight. The upper limit of the amount can be 10, 9, 8, 7, 6, 5.5, 5, 4.5, 4, 3.8, 3.6, 3.4, 3.3, 3.2, 3.1 or 3 parts by weight. A person skilled in the art will understand that any range formed by any of the explicitly disclosed lower limits and upper limits is explicitly encompassed in the present specification.

The process for the preparation of the above-described latex polymer (I) can be performed at temperatures of from 0 to 130° C., preferably of from 0 to 100° C., particularly preferably of from 5 to 70° C., very particularly preferably of from 5 to 60° C., in the presence of no or one or more emulsifiers, no or one or more colloids and one or more initiators. The temperature includes all values and sub-values therebetween, especially including 5, 10, 15, 20, 25, 30, 35, 40, 45, 50, 55, 60, 65, 70, 75, 80, 85, 90, 95, 100, 105, 110, 115, 120 and 125° C.

Initiators which can be used when carrying out the present invention include water-soluble and/or oil-soluble initiators which are effective for the purposes of the polymerization. Representative initiators are well known in the technical area and include, for example, azo compounds (such as, for example, AIBN, AMBN and cyanovaleric acid) and inorganic peroxy compounds, such as hydrogen peroxide, sodium, potassium and ammonium peroxydisulfate, peroxycarbonates and peroxyborates, as well as organic peroxy compounds, such as alkyl hydroperoxides, dialkyl peroxides, acyl hydroperoxides, and diacyl peroxides, as well as esters, such as tertiary butyl perbenzoate and combinations of inorganic and organic initiators.

The initiator is used in a sufficient amount to initiate the polymerization reaction at a desired rate. In general, an amount of initiator of from 0.01 to 5, preferably of from 0.1 to 4%, by weight, based on the weight of the total polymer, is sufficient. The amount of initiator is most preferably of from 0.01 to 2% by weight, based on the total weight of the polymer. The amount of initiator includes all values and sub-values therebetween, especially including 0.01, 0.1, 0.5, 1, 1.5, 2, 2.5, 3, 4 and 4.5% by weight, based on the total weight of the polymer.

The above-mentioned inorganic and organic peroxy compounds may also be used alone or in combination with one or more suitable reducing agents, as is well known in the art. Examples of such reducing agents which may be mentioned are sulfur dioxide, alkali metal disulfites, alkali metal and ammonium hydrogen sulfites, thiosulfates, dithionites and formaldehyde sulfoxylates, as well as hydroxylamine hydrochloride, hydrazine sulfate, iron (II) sulfate, cuprous naphthanate, glucose, sulfonic acid compounds such as sodium methane sulfonate, amine compounds such as dimethylaniline and ascorbic acid. More preferred is the use of a proprietary sodium salt of an organic sulfinic acid derivative, such as Bruggolite® FF6 or Bruggolite® FF6M. The quantity of the reducing agent is preferably 0.03 to 10 parts by weight per part by weight of the polymerization initiator.

Surfactants or emulsifiers which are suitable for stabilizing the latex particles include those conventional surface-active agents for polymerization processes. The surfactant or surfactants can be added to the aqueous phase and/or the monomer phase. An effective amount of surfactant in a seed process is the amount which was chosen for supporting the stabilization of the particle as a colloid, the minimization of contact between the particles and the prevention of coagulation. In a non-seeded process, an effective amount of surfactant is the amount which was chosen for influencing the particle size.

Representative surfactants include saturated and ethylenically unsaturated sulfonic acids or salts thereof, including, for example, unsaturated hydrocarbonsulfonic acid, such as vinylsulfonic acid, allylsulfonic acid and methallylsulfonic acid, and salts thereof; aromatic hydrocarbon acids, such as, for example, p-styrenesulfonic acid, isopropenylbenzenesulfonic acid and vinyloxybenzenesulfonic acid and salts thereof; sulfoalkyl esters of acrylic acid and methacrylic acid, such as, for example, sulfoethyl methacrylate and sulfopropyl methacrylate and salts thereof, and 2-acrylamido-2-methylpropanesulfonic acid and salts thereof; alkylated diphenyl oxide disulfonates, sodium dodecylbenzenesulfonates and dihexyl esters of sodium sulfosuccinate, Sodium alkyl esters of sulfonic acid, ethoxylated alkylphenols and ethoxylated alcohols; fatty alcohol (poly)ethersulfates.

The type and the amount of the surfactant is governed typically by the number of particles, their size and their composition. Typically, the surfactant is used in amounts of from 0 to 20, preferably from 0 to 10, more preferably from 0 to 5, wt.-%, based on the total weight of the monomers. The amount of surfactant includes all values and sub-values therebetween, especially including 0, 0.1, 0.5, 1, 2, 3, 4, 5, 6, 7, 8, 9, 10, 11, 12, 13, 14, 15, 16, 17, 18 and 19 wt.-%, based on the total weight of the monomer. According to one embodiment of the present invention, the polymerization is conducted without using surfactants.

Various protective colloids can also be used instead of or in addition to the surfactants described above. Suitable colloids include polyhydroxy compounds, such as partially acetylated polyvinyl alcohol, casein, hydroxyethyl starch, carboxymethylcellulose, hydroxyethylcellulose, hydroxypropylcellulose, polysaccharides, and degraded polysaccharides, polyethylene glycol and gum arabic. The preferred protective colloids are carboxymethylcellulose, hydroxyethylcellulose and hydroxypropylcellulose. In general, these protective colloids are used in contents of from 0 to 10, preferably from 0 to 5, more preferably from 0 to 2 parts by weight, based on the total weight of the monomers. The amount of protective colloids includes all values and sub-values therebetween, especially including 1, 2, 3, 4, 5, 6, 7, 8 and 9 wt.-%, based on the total weight of the monomers.

The person skilled in the art will appreciate the type and amounts of monomers bearing polar functional groups, surfactants and protective colloids that are to be selected to make the polymer latex according to the present invention suitable for dip-molding applications. Thus, it is preferred that the polymer latex composition of the present invention has a certain maximum electrolyte stability determined as critical coagulation concentration of less than 30 mmol/l $CaCl_2$, preferably less than 25 mmol/l, more preferred less than 20 mmol/l, most preferred less than 10 mmol/l (determined for a total solids content of the composition of 0.1% at pH 10 and 23° C.).

If the electrolyte stability is too high, then it will be difficult to coagulate the polymer latex in a dip-molding process, with the result that either no continuous film of the polymer latex on the immersed mold is formed or the thickness of the resulting product is non-uniform.

It is within the routine of the person skilled in the art to appropriately adjust the electrolyte stability of a polymer latex. The electrolyte stability will depend on certain different factors, for example, amount and selection of monomers to be used for making the polymer latex, especially monomers containing polar-functional groups, as well as the selection and amount of the stabilizing system, for example, the emulsion polymerization process for making the polymer latex. The stabilizing system may contain surface-active agents and/or protective colloids.

A person skilled in the art is able, depending on the selected monomers and their relative amounts for making the polymer latex of the present invention, to adjust the stabilizing system in order to achieve an electrolyte stability according to the present invention.

Since there are so many different influences on the electrolyte stability, the adjustment is best made by trial and error experiments. But this can be easily done without any inappropriate effort using the test method for electrolyte stability, as disclosed above.

It is frequently advisable to perform the emulsion polymerization additionally in the presence of buffer substances and chelating agents. Suitable substances are, for example, alkali metal carbonates and hydrogen carbonates, alkali metal phosphates and pyrophosphates (buffer substances) and the alkali metal salts of ethylenediaminetetraacetic acid (EDTA) or hydroxyl-2-ethylenediaminetriacetic acid (HEEDTA) as chelating agents. The quantity of buffer substances and chelating agents is usually 0.001-1.0 wt.-%, based on the total quantity of monomers.

Furthermore, it may be advantageous to use chain transfer agents (regulators) in emulsion polymerization. Typical agents are, for example, organic sulfur compounds, such as thioesters, 2-mercaptoethanol, 3-mercaptopropionic acid and $C_1$-$C_{12}$ alkyl mercaptans, n-dodecylmercaptan and t-dodecylmercaptan being preferred. The quantity of chain transfer agents, if present, is usually 0.05-3.0 wt.-%, preferably 0.2-2.0 wt.-%, based on the total weight of the used monomers.

Furthermore, it can be beneficial to introduce partial neutralization to the polymerization process. A person skilled in the art will appreciate that by appropriate selections of this parameter the necessary control can be achieved.

Crosslinking Component (II)

According to the present invention, the crosslinking component (II) is selected from monomeric compounds, oligomeric or polymeric compounds. Suitable oligomeric or polymeric compounds may be selected from polyethers, polyesters, acrylic polymers and polyurethanes. Latex polymers may also be used as crosslinking component (II).

According to one aspect, the crosslinking component (II) comprises a plurality of functional groups (b) that are reactive with the functional groups (a) on the latex polymer (I). The functional group (b) forms upon reaction with functional group (a) on latex polymer (I) a thermally reversible linkage selected from one or more of (i) a linkage having the structural formula

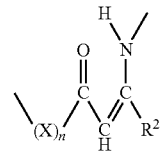

wherein X is —O— or —NR$^1$—,
n is 0 or 1,
R$^1$ is hydrogen or a hydrocarbyl group, and
R$^2$ is a hydrocarbyl group; and
(ii) a beta-hydroxy ester linkage.

A person skilled in the art will appreciate that the functional group (a) in latex polymer (I) and functional group (b) on the crosslinking component (II) need to be appropriately selected to provide the above-defined thermally reversable linkage when latex polymer (I) and the crosslinking component react with each other upon forming an elastomeric film.

According to the present invention, the functional group (b) may be selected from an oxirane group, a carboxylic acid group, salt or anhydride thereof, a primary amine group and a functional group having the structure:

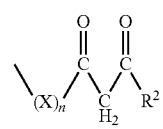

wherein X, n, R$^1$ and R$^2$ are defined as above.

Latex polymers to be suitable as crosslinking component (II) may be made as described above for the latex polymer (I) including the specific selections of monomers and their relative amounts, provided that suitable ethylenically unsaturated monomers bearing a functional group (b) are selected. In the monomer mixture for a latex polymer suitable as crosslinking component (II), the relative amount of ethylenically unsaturated monomers comprising a functional group (b) can be much higher compared to the amount of ethylenically unsaturated monomers comprising a functional group (a) as described for latex polymer (I). In particular, the amount of ethylenically unsaturated monomers comprising a functional group (b) in the monomer mixture may be from 0.05 to 60 wt.-% based on the total weight of ethylenically unsaturated monomers. Suitable upper limits are 55 wt.-% or 50 wt.-% or 45 wt.-% or 40 wt.-% or 35 wt.-% or 30 wt.-% or 25 wt.-% or 20 wt.-%. Suitable lower limits are 0.1 wt.-% or 0.5 wt.-% or 1 wt.-% or 3 wt.-% or 5 wt.-% or 8 wt.-% or 10 wt.-% or 15 wt.-%. The person skilled in the art will appreciate that any range defined by any of the above lower and upper limits is disclosed hereby.

According to the present invention, it is preferred that the functional group (a) is a carboxylic acid group, a salt or anhydride thereof, and functional group (b) is an oxirane group.

According to the present invention, the crosslinking component (II) may be selected from
- polyoxirane-functional latex particles; and
- polyoxirane-functional monomeric or oligomeric compounds, preferably selected from bis[2-(3,4-epoxycyclohexyl)ethyl]-tetramethyldisiloxane,bis[4-(glycidyloxy)phenyl]methane,1,5-bis(glycidoxypropyl)-3-phenyl-1,1,3,5,5-pentamethyltrisiloxane,1,3-bis(glycidoxypropyl)tetramethyl-disiloxane,bisphenol A diglycidyl ether, bisphenol A propoxylate diglycidyl ether, bisphenol F diglycidyl ether, 1,3-butadiene diepoxide, 1,4-butanediol diglycidyl ether, dicyclopentadiene dioxide, 1,2,5,6-diepoxycyclooctane, 1,2,7,8-diepoxyoctane, diglycidyl 1,2-cyclohexanedicarboxylate, N,N-diglycidyl-4-glycidyloxyaniline, glycerol diglycidyl ether, 4,4'-methylenebis(N,N-diglycidylaniline), neopentyl glycol diglycidyl ether, resorcinol diglycidyl ether, tetrakis[(epoxycyclohexyl)ethyl]tetramethyl-cyclotetrasiloxane, tris(2,3-epoxypropyl) isocyanurate, tris(glycidoxypropyldimethylsiloxy)-phenylsilane, tris(4-hydroxyphenyl)methane triglycidyl ether, trimethylolpropane triglycidyl ether, epoxycyclohexylethyl terminated polydimethylsiloxanes, (epoxycyclohexylethylmethylsiloxane) dimethylsiloxane copolymers, epoxypropoxypropyl terminated polydimethylsiloxanes, epoxypropoxypropyl terminated polyphenylmethylsiloxanes, epoxypropoxypropyl)dimethoxysilyl terminated polydimethylsiloxanes, (epoxypropoxypropylmethylsiloxane)-(dimethylsiloxane) copolymers, poly(bisphenol A-co-epichlorohydrin), glycidyl endcapped, poly(ethylene glycol) diglycidyl ether (various molecular weights), poly[(o-cresyl glycidyl ether)-co-formaldehyde], poly[(phenyl glycidyl ether)-co-formaldehyde], poly(propylene glycol) diglycidyl ether, preferably selected from glycerol diglycidyl ether, tris (4-hydroxyphenyl)methane triglycidyl ether, (epoxycyclohexylethylmethylsiloxane) dimethylsiloxane copolymers or poly(ethylene glycol) diglycidyl ether (Mn=500 Da).

Alternatively, the crosslinking component (II) may comprise functional groups (b) and (c) that are different from each other, wherein functional groups (c) on different molecules of component (II) are capable of reacting with each other. Suitable functional group (c) may be selected from silane groups bearing a plurality of silicon-bonded hydroxyl groups and/or hydrolysable groups, preferably selected from alkoxy groups, oximo groups, acyloxy groups, aminooxy groups, and phosphate groups and from ethylenically unsaturated groups, preferably (meth)acrylic groups.

Suitable crosslinking components (II) bearing functional groups (b) and (c) may be selected from
- oxirane-functional di- or tri alkoxysilanes, preferably from (3-glycidoxypropyl)trialkoxysilanes;
- primary amino-functional di- or tri alkoxysilanes, preferably from (3-aminopropyl)trialkoxysilanes; and
- oxirane-functional ethylenically unsaturated compounds, preferably glycidyl (meth)acrylate.

Aqueous Polymer Latex Composition:

The aqueous polymer latex composition of the present invention can be prepared by first making the polymer latex comprising the latex polymer (I) as described above and then combining the obtained polymer latex with the crosslinking component (II). In the aqueous polymer latex composition of the present invention, the latex polymer (I) and the crosslinking component (II) may be present in relative amounts to provide a molar ratio of functional groups (b) to functional group (a) from 0.1 to 2, preferably from 0.1 to 1.5, more preferred from 0.2 to 0.9, most preferred from 0.3 to 0.6.

Various other additives and ingredients can be added in order to prepare the latex composition of the present invention. Such additives include, for example, antifoams, wetting agents, thickeners, plasticizers, fillers, pigments, dispersants, optical brighteners, antioxidants, biocides and metal chelating agents. Known antifoams include silicone oils and acetylene glycols. Customary known wetting agents include alkylphenol ethoxylates, alkali metal dialkylsulfosuccinates, acetylene glycols and alkali metal alkylsulfate. Typical thickeners include polyacrylates, polyacrylamides, xanthan gums, modified celluloses or particulate thickeners, such as silicas and clays. Typical plasticizers include mineral oil, liquid polybutenes, liquid polyacrylates and lanolin. Titanium dioxide ($TiO_2$), calcium carbonate and clay are the fillers typically used. Preferably, the aqueous polymer latex composition is free of sulfur vulcanization agents and accelerators for sulfur vulcanization and/or ZnO and the pH of the aqueous polymer latex composition is optionally adjusted to be in the range of 8.5 to 13, preferably of 9 to 12.5, most preferred 9.5 to 12.

It is also envisaged that antimicrobials or biocides may be incorporated in the latex composition to help in the prevention of cross contamination of materials where the latex is used as a barrier between surfaces.

Alternatively, instead of compounding the polymer latex of the present invention, also a polymer latex comprising the latex polymer (I) as defined above may be compounded in the same way as described above and during or after the compounding step a crosslinking component (II) as defined above is added to provide the compounded latex composition of the present invention. Of course, all variations with respect to the latex polymer (I), crosslinking component (II) and their relative amounts based on the total amount of latex polymer as described above can be used.

Method for Making a Continuous Elastomeric Film:

According to the present invention, the method for the production of a continuous elastomeric film comprises:
A) providing an aqueous polymer latex composition as defined above;

B) forming from the aqueous polymer latex composition a continuous polymer film;

C) optionally drying the continuous polymer film obtained in step B);

D) curing the continuous polymer film obtained in step B) or C) to form a continuous elastomeric film; and E) optionally rolling the continuous elastomeric film obtained in step D) into a roll.

According to the present invention, the aqueous polymer latex composition in step (B) may be cast on a substrate at a preselected thickness, then cured, preferably by heating, to form the elastomeric film, followed by stripping the obtained elastomeric film from the substrate. Casting can be performed by a conventional film casting machine. Drying and curing may be performed simultaneously, for example by using radiation heaters. Stripping from the substrate can be done in a powdered or powder-free way. After stripping, the cured elastomeric film may be rolled into a roll for shipping and further processing. The method may be run as a continuous process with a moving substrate. The substrate is a moving belt which is preferably of a flexible material such as a plastic, preferably a heat resistant plastic such as polytetrafluoroethylene (PTFE) or Teflon. However other material can be used that is capable of providing a support to enable a thin film to be transferred between points in a production process. With this process, very thin films having a thickness lower than usually obtainable in a dip-molding process at a high line speed can be produced. Typically, the line will be operating at a speed where the film is cast at a speed of at least 3 mm per second and typically the speed can be 3-5 mm per second, 3-10 mm or 3 to 20 or up to 3 to 50 mm per second.

Alternatively, the aqueous polymer latex composition of the present invention is treated, preferably by heating or by using a heat sensitizer, to promote coagulation of the latex composition; subsequently the aqueous polymer latex composition is diluted to a preselected solids content that correlates to the preselected thickness of the film, and in step (B) a rotating heated or cooled roll is contacted with the aqueous polymer latex composition to coagulate a polymer film on the roll surface, followed by curing the film, preferably by heating, to form the elastomeric film and stripping the obtained elastomeric film from the roll. Suitable heat sensitizers are known to the person skilled in the art and can be selected from any compound that promotes coagulation of the latex upon temperature change. Suitable heat sensitizers may be selected from polysiloxanes, guanidines or any other type of coagulant that can control the thickness of the film so that a thin film can be formed. By thin film the thickness is typically less than 1 mm, preferably less than 0.5 mm, more preferably less than 0.05 mm and even more preferably less than 0.02 mm. Coagulation can be carried out on a heat resistant surface such as glass or more preferably a ceramic and then the film can be transferred to a flexible support, such as a belt of plastic e.g. biaxially-oriented polypropylene (BOPP) to enable the coagulated film to be rolled. However as an alternative coagulation may be carried out on a heat resistant flexible support such as a PTFE or Teflon moving belt where coagulation can occur at one stage of the production process and then once coagulated and formed the film can then be transferred, using the same belt, to a rolling process where the film is rolled into a final roll of material (such a card or steel support roll) for shipping to customers or for storage for processing into final products. For final rolling the film that is formed can be stripped form the support using a powdered or powder-free way and then the cured elastomeric film may be rolled into a roll for shipping and further processing. It is envisaged however that in some circumstances the film can remain on a support surface, which may be a thin plastic layer and then rolled and in this situation the support forms a protective layer which can then be peeled from the film when the film is to be processed.

According to a further variation of the method of the present invention, the aqueous polymer latex composition is diluted to a preselected solids content that correlates to the preselected thickness of the film, a heated roll is contacted with a coagulant solution comprising multivalent cations and dried; subsequently, in step (B), the heated roll is contacted with the aqueous polymer latex composition to coagulate a polymer film on the roll surface, followed by curing the film to form the elastomeric film and stripping the obtained elastomeric film from the roll. Typically, the flexible support is a flexible material e.g. a polymer such as BOPP or even a heat resistant material such as Teflon or PTFE. Stripping from the roll can be done in a powdered or powder-free way. After stripping, the cured elastomeric film may be rolled into a roll for shipping and further processing.

A person skilled in the art will appreciate that heat sensitizing of the aqueous polymer latex composition or coating the substrate with a coagulant can also be combined with the first embodiment of the method of the present invention as described above.

With the method of the present invention a continuous elastomeric film having a thickness of 0.03 to 3.00 mm, preferably 0.03 to 0.60 mm, most preferably 0.04 to 0.40 mm can be produced.

A particular advantage of the present invention is that due to the thermal processability of the elastomeric film of the present invention, as will be described below with respect to the process for making elastomeric articles, any waste material obtained in the production or processing of the continuous elastomeric film of the present invention or any other elastomeric material containing the thermally reversible linkage of the present invention can be recycled to make a continuous elastomeric film of the present invention.

Thus, the present invention also relates to a method for the production of a continuous elastomeric film by forming an elastomeric material containing thermally reversible linkages selected from one or more of (i) a linkage having the structural formula

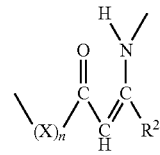

wherein X is —O— or —NR$^1$—,
n is 0 or 1,
R$^1$ is hydrogen or a hydrocarbyl group, and
R$^2$ is a hydrocarbyl group; and (ii) a beta-hydroxy ester linkage;

into a continuous film by subjecting the material to a pressure of 1-20 MPa and a temperature of 40° C. to 200° C. and optionally rolling the continuous elastomeric film into a roll.

Process for Making an Elastomeric Article

The present invention further relates to a process for making an elastomeric article by aligning two separate continuous elastomeric films according to the present invention;

cutting the aligned continuous elastomeric films into a preselected shape to obtain two superposed layers of the elastomeric films in the preselected shape; and joining together the superposed layers of elastomeric film at at least a preselected part of the periphery of the superposed layers to form an elastomeric article.

The joining together may be performed by using thermal means, preferably selected from heat sealing and welding or by gluing.

The cutting may also be performed by a heatable template cutting device providing the preselected shape and the cutting device is heated in the sections that contact the elastomeric films where the films are joined together, thereby simultaneously cutting the elastomeric films into the preselected shape and heat sealing the preselected parts of the periphery of the superposed elastomeric films. Alternatively, a laser cutter may be used. The applied temperature may be in the range of 120° C. to 180° C., preferably 130° C. to 160° C. and more preferably is 160° C. to 190° C. and typically a temperature of 180° C. is used in production. The cutting device is preferably pressed against the superposed elastomeric films with a pressure of at least 1 MPa for at least 1 second. If the temperature is higher the pressure used may be less and this is optimized in accordance with the required production speed. Typically, production of 45,000 pieces per hour is required. The cut and seal process can be matched to the production speed on known dipping processes and it also has the advantage that less production space is needed because the length of the line is less in order to avoid the need to drying time during the dipping process. It is also envisaged that a laser cutting of the article shape may be used. If cold laser cutting is used the articles can be cut out for further processing such as sealing or if hot laser cutting is used the articles may be cut and sealed to form the final product. The outline of the article to be produced may be input using a CAD system so that pre-programmed article outlines can be formed for a production run. The use of a laser system has the advantage of avoiding fouling of a stamp used in a press and seal method.

The articles that are typically made using this process are infinite but preferred articles are selected from surgical gloves, examination gloves, industrial gloves, and household gloves, single-use gloves, textile supported gloves, catheters, elastomeric sleeves, which may be used on medical inserts such as stents or medical probes and condoms.

The present invention will be further illustrated with reference to the following examples.

Determination of Physical Parameters:

The dispersions were characterized by determination of total solids content (TSC), pH value, gel content, viscosity (Brookfield LVT) and z-average particle size. Furthermore, the final films were tested for tensile properties.

Determination of Gel Content:

A sample of the latex under test was sieved through a white filter cloth to remove any skin or coagulum. A thin film of latex was then cast onto a glass plate and spread using a spreader until a film thickness of approximately 0.1~0.3 mm was achieved.

The glass plate was placed in the air-circulating oven at temperature of 55~60° C. for 2 hours. After drying, the polymer was removed from the plate and cut into small pieces. Approximately 1 gram of the dry polymer was weighed into a 175 ml glass jar and the polymer weight was recorded down. 100 ml (+1 ml) of the MEK (methyl ethyl ketone) and a magnetic stirrer bar were then added. The jar was sealed with a lid and placed on the magnetic stirrer in the water bath, which was set to 35° C. Agitation was carried out for 16 hours. After that, the sample was removed from the water bath and allowed to cool to ambient temperature. A shallow foil cup was accurately weighed. The jar was left aside for a while to separate the solvent and un-dissolved polymer. 15 ml of the solution was filtered through a filter paper into a clear glass container before 5 mL of this solution was transferred to the shallow foil cup using a pipette. The cup was placed under an IR lamp (115~120° C.) in a fume cupboard, for 30 minutes. Finally, the cup was removed from the IR lamp and cooled to room temperature before reweighed.

Calculation of Gel Content:

Weight of Dry Sample=A

Weight of Shallow Foil Cup=B

Weight of Shallow Foil Cup+Dried Contents=C $$\% \text{ TSC of Solvent } (W/V) = (C-B) \times 100 = D$$

Total Weight of Dissolved Polymer (in 100 ml)=100×D/100=E $$\% \text{ Gel Content} = (1 - E/A) \times 100$$

Determination of Total Solid Contents (TSC):

The determination of total solids content is based on a gravimetric method. 1-2 g of the dispersion was weighed into a tared aluminum dish, on an analytical balance. The dish was stored for 1 hour at 120° C. in a circulating air oven until constant mass was reached. After cooling to room temperature, the final weight was then re-determined. The solids content was calculated as follows:

$$TSC = \frac{m_{initial} - m_{final}}{m_{initial}} 100\% \qquad (1)$$

where, $m_{initial}$=initial mass of latex, $m_{final}$=mass after drying

Determination of pH Value:

The pH value was determined according to DIN ISO 976. After applying a 2-point calibration using buffer solutions, the electrode of a Schott CG 840 pH meter was immersed in the dispersion at 23° C. and the constant value on the display was recorded as the pH value.

Determination of Viscosity:

The latex viscosity was determined at 23° C. using a Brookfield LVT viscometer. Approximately 220 ml of the liquid (freed of air bubbles) was filled into a 250 ml beaker and the spindle of the viscometer was immersed up to the mark on the spindle. The viscometer was then switched on, and after approximately 1 minute, the value was recorded until it was constant. The viscosity range determines the choice of spindle and rotational speed and the factor for the recorded value to calculate the viscosity. The information regarding spindle and revolutions per minute used are shown in parenthesis.

Determination of the Particle Size (PS):

The z-average particle size was measured using a Malvern Zetasizer Nano S (ZEN 1600) using dynamic light scattering. The latex sample was diluted with deionized water to the turbidity level described in the manual and transferred in the test cuvette. The cuvette was gently mixed to make the sample homogenous and the cuvette was placed in the measurement device. The value was recorded as software-generated z-average particle size.

Cast Film Preparation:

A glass plate was cleaned by firstly washing it with detergent, followed by deionized water before drying in an air-circulating oven set at 65-70° C. A suitably cleaned dam arrangement was then placed onto the glass slide and an aliquot of the desired compounded latex was then carefully poured into the dam to prevent entrainment of any air bubbles, and at a quantity which is sufficient to produce a film of approximately 1 mm thickness upon drying. The latex was initially allowed to dry at room temperature and humidity for 3 days. The film was then carefully removed from the glass plate and annealed in a circulating air oven set at 90° C. for 24 hours to ensure complete drying and to promote crosslink formation.

Dipped Film Preparation:

Nitrile latex with compounding materials at the desired pH value was stirred for at least 3 hours at room temperature, and then coagulant dipped as follows:

A ceramic spade was washed with soap and then thoroughly rinsed with deionized water before drying in an air-circulating oven set at 65-70° C. (spade temperature, 55-60° C.) until dry. A solution of coagulant was prepared by dissolving calcium nitrate (18% wt.) and calcium carbonate (2% wt.) in deionized water. The dry spade was then dipped into the salt solution, removed and then dried in an air-circulating oven set at 70-75° C. (spade temperature, 60-65° C.) until dry. The salt-coated spade was then dipped into the desired, compounded latex (which has total solid content of 18 wt.-% and matured for 24 hours at room temperature after compounding) for a dwell time of 5 seconds, before removing it and placing the latex-coated spade into an air circulating oven, set at 100° C. for 1 minute, to gel the film. The thus gelled film was then washed in a tank of deionized water set to 50-60° C. for 1 minute, before curing in an air-circulating oven set to 120° C. for 20 minutes; after which the thus cured/vulcanized film was cooled and manually stripped from the spade. The films prepared from the latexes were subjected to heat sealing process and tested for their tensile strength properties.

Cast Film Preparation:

Nitrile latex with compounding materials at the desired pH value was stirred for at least 3 hours at room temperature, and then cast on a substrate by using an automatic film applicator (TQC Sheen AB4420 model) as follows:

By using a wire bar coater with size 150 μm, the compounded nitrile latex was cast on a substrate selected from biaxially-oriented polypropylene (BOPP) plastic or ceramic tile or ceramic spade with a specific texture used commonly for glove dipping (from Ceramtec, 1614A model with SR40FF texture) with a casting speed of more than 3 mm/s. Before the latex casting process, optionally the ceramic plate can be coated also with a layer of coagulant. The process is similar to the one mentioned in the dipped film preparation above where a solution of coagulant was prepared and followed by immersion of the spade into the solution, removed and then dried in an air-circulating oven set at 70-75° C. (spade temperature, 60-65° C.) until dry. After the casting process, gelling of the film was carried out at 65° C. for 10 minutes. The gelled film was then washed in a tank of deionized water set to 50-60° C. for 1 minute before curing in an air-circulating oven set to 120° C. for 20 minutes; after which the thus cured/vulcanized film was cooled and stripped from the substrate. The films prepared from the latexes were subjected to heat sealing process.

Sealing of Dipped or Cast Films:

1 piece of BOPP plastics with smaller dimensions was put in between 2 pieces of dipped or cast films to enable only 2 long and 1 short edges of the overlapped films to be sealed. The films with the BOPP plastics were placed between two polished steel plates before hot pressing under certain pressure for a period stated in each example, and at the temperature stated in each example. After the hot pressing, the formed rubber articles were cooled, and the BOPP plastics were removed/striped. The sealed rubber articles were then tested for leakage using a water leak test.

Determination of the Tensile Strength Properties on Crosslinked (Vulcanized) Elastomer Samples:

The tensile properties of the crosslinked (vulcanized) or recycled elastomer films were tested in accordance with ISO37-77 (5$^{th}$ Edition 2011-12-15), the dumbbell specimens were cut from gloves prepared from each latex compound using a Type IS037-2 cutter (width of narrow portion=4 mm, length of narrow portion=25 mm, overall length=75 mm, the thicknesses of the dumbbells are stated in the results Tables) and tested on a Hounsfield HK10KS Tensiometer fitted with H500LC extensometer, at an extension rate of 500 mm/min.

Water Leaking Test:

30 mL of water was filled into the sealed dipped or cast films which were suspended by using a clamp and observed for leaking for at least 2 hours. The test time is much longer than that of the ASTM standard (ASTM D5151) of water leak test for detection of holes in medical gloves where only 2 minutes is used.

The following abbreviations are used in the Examples:
BA=n-butyl acrylate
MAA=methacrylic acid
Bd=1,3-butadiene (butadiene)
ACN=acrylonitrile
GMA=glycidyl methacrylate
tDDM=tert-dodecyl mercaptan
Na$_4$EDTA=tetra sodium salt of ethylenediaminetetraacetic acid
tBHP=tertiary butyl hydroperoxide
TSC=total solid content
PS=particle size
ZnO=zinc oxide
ZDEC=zinc diethyldithiocarbamate In the following, all parts and percentages are based on weight unless otherwise specified.

EXAMPLES

Example 1: Preparation of Carboxylated Nitrile Latex 2 parts by weight (based on polymer solids) of an oxirane-free seed latex (average particle size 36 nm) and 80 parts by weight of water (based on 100 parts by weight of monomer including the seed latex) were added to a nitrogen-purged autoclave and subsequently heated to 30° C. Then 0.01 parts by weight of Na$_4$EDTA and 0.005 parts by weight of Bruggolite® FF6 dissolved in 2 parts by weight of water were added, followed by 0.08 parts by weight of sodium persulfate dissolved in 2 parts by weight of water. Then, the monomers (35 parts by weight of acrylonitrile, 58 parts by weight of butadiene, 5 parts by weight of methacrylic acid) were added together with 0.6 parts by weight of tDDM over a period of 4 hours. Over a period of 10 hours 2.2 parts by weight of sodium dodecyl benzene sulfonate, 0.2 parts by weight of tetra sodium pyrophosphate and 22 parts by weight of water were added. The co-activator feed of 0.13 parts by weight of Bruggolite® FF6 in 8 parts by weight of water was added over 9 hours. The temperature was maintained at 30° C. up to a conversion of 95%, resulting in a total solids content of 45%. The polymerization was short-stopped by addition of 0.08 parts by weight of a 5% aqueous solution of diethylhydroxylamine. The pH was adjusted using potassium hydroxide (5% aqueous solution) to pH 7.5 and the residual monomers were removed by vacuum distillation at 60° C. 0.5 parts by weight of a Wingstay L-type antioxidant (60% dispersion in water) was added to the raw latex, and the pH was adjusted to 8.2 by addition of a 5% aqueous solution of potassium hydroxide.

The following characterization results were obtained for Example 1:
TSC=44.9 wt. %
pH=8.2
Viscosity=38 mPas (1/60)
Particle size, $P_z$=121 nm
Gel content=0%

Example 2: Preparation of Oxirane-Functional Latex

A nitrogen-purged autoclave was charged with 2.0 parts by weight of diphenyl oxide disulfonate dissolved in 185 parts by weight of water relative to 100 parts by weight monomer and heated to a temperature of 70° C. 0.1 parts by weight of tDDM and 0.05 parts by weight of $Na_4EDTA$ were added to the initial charge, together with 0.7 parts by weight of ammonium peroxodisulfate (12% solution in water) added in an aliquot addition. Then 45.4 parts by weight of butadiene, 14.6 parts by weight of acrylonitrile and a solution of 5.0 parts by weight of diphenyl oxide disulfonate dissolved in 50 parts by weight of water were added over a period of 6.5 hours. The addition of 40 parts by weight of GMA was started after 1 hour and added over a period of 6.5 hours. After the addition of the monomers, the temperature was maintained at 70° C. The polymerization was maintained up to a conversion of 99%. The reaction mixture was cooled to room temperature and sieved through a filter screen (90 μm).

The following characterization results were obtained for Example 2:
TSC=37.7 wt. %
pH=7.1
Gel content=96%
Viscosity=15 mPas (1/60)
Particle size, $P_z$=39 nm Example 3: (Comparative)

A portion of the latex of example 1 was adjusted to a pH value of 10 using an aqueous solution of potassium hydroxide, and compounded with 1 phr zinc oxide, 1 phr titanium dioxide, 0.8 phr of sulfur and 0.7 phr of ZDEC. The compound was then adjusted to a concentration of 18% wt. solids and stirred for 3 hours. A dry, salt-coated spade was then dipped into the compounded latex solution with a dwell time of 5 seconds before the film was gelled at 100° C. for 1 minute, washed with deionized water for 1 minute (in a tank set at 50-60° C.) for 1 minute, followed by drying and curing/vulcanization in an air-circulating oven set at 120° C. for 20 minutes, to ensure complete drying and crosslink formation. The cured films were then tested for tensile properties and presented in Table 1. 2 separate dipped films were placed between two polished steel plates before hot pressing at 5.8 MPa for 10 minutes at 100° C. and 90 seconds for 180° C., respectively. After the hot pressing, the films were cooled. For both sealing conditions the edges were not sealed and the samples cannot be subjected to the water leak test.

Example 4

To an aliquot of latex of Example 1 was added an aliquot of the latex of Example 2, such that the blending ratio was 90:10 by wet weight. The blend was adjusted to a pH value of 11.5 using a solution of potassium hydroxide and the blend stirred for 3 hours before it was dipped with a dry, salt-coated spade and processed in accordance with the protocol given in Example 3. The cured films were then tested for tensile properties and presented in Table 1. 2 separate dipped films were placed between two polished steel plates before hot pressing at 5.8 MPa for 10 minutes at 100° C. After the hot pressing, the films were cooled and tested for water leaking test. 30 mL of water was filled into the sealed films which were then suspended with a clamp and observed for leaking for at least 2 hours.

No leaking was observed after 2 hours.

Example 5

To an aliquot of latex of Example 1 was added an aliquot of the latex of Example 2, such that the blending ratio was 90:10 by wet weight. The blend was adjusted to a pH value of 10.0 using a solution of potassium hydroxide and compounded with zinc oxide (1 phr), the blend was then stirred for 3 hours before it was dipped with a dry, salt-coated spade and processed in accordance with the protocol given in Example 1. 2 separate dipped films were placed between two polished steel plates before hot pressing at 5.8 MPa for 90 seconds at 180° C. After the hot pressing, the films were cooled and tested for water leaking test. 30 mL of water was filled into the sealed films which were then suspended with a clamp and observed for leaking for at least 2 hours. No leaking was observed after 2 hours.

TABLE 1

| | (Dipped film): | | |
|---|---|---|---|
| Examples | Tensile strength (MPa) | Elongation at break (%) | Thickness (mm) |
| Example 3 | 27.2 | 564 | 0.054 |
| Example 4 | 27.3 | 563 | 0.054 |
| Example 5 | 30.1 | 562 | 0.054 |

Example 6

To an aliquot of latex of Example 1 was added an aliquot of the latex of Example 2, such that the blending ratio was 90:10 by wet weight. The blend was adjusted to a pH value of 10.0 using a solution of potassium hydroxide and compounded with zinc oxide (1 phr), the blend was then stirred for 3 hours before it was cast on a BOPP plastic as substrate by using a wire bar coater with size 150 μm, fixed to an automatic film applicator with a casting speed of 5 mm/s. After the casting process, gelling of the film was carried out at 65° C. for 10 minutes. The gelled film was then washed in a tank of deionized water set to 50-60° C. for 1 minute, before curing in an air-circulating oven set to 120° C. for 20 minutes; after which the thus cured/vulcanized film was cooled and stripped from the substrate.

The films prepared from the latices were then tested for their tensile strength properties and presented in Table 2. 2 separate dipped films were placed between two polished steel plates before hot pressing at 5.8 MPa for 10 minutes at 100° C. and 90 seconds at 180° C., respectively. After the hot pressing, the films were cooled and tested for water leaking test. 30 mL of water was filled into the sealed films which were then suspended with a clamp and observed for leaking for at least 2 hours. No leaking was observed after 2 hours for both sealing conditions.

TABLE 2

| Examples | Tensile strength (MPa) | Elongation at break (%) | Thickness (mm) |
|---|---|---|---|
| Example 6 | 21.4 | 645 | 0.040 |

The invention claimed is:

1. A method for the production of a continuous elastomeric film comprising:
   A) providing an aqueous polymer latex composition comprising:
      (I) particles of a latex polymer obtained by free-radical emulsion polymerization of a mixture of ethylenically unsaturated monomers, the particles bearing a plurality of functional groups, and
      (II) a crosslinking component comprising a plurality of functional groups, at least one thereof being reactive with the functional groups on the latex polymer particles;
   B) forming from the aqueous polymer latex composition a continuous polymer film or an elastomeric material;
   C) optionally drying the continuous polymer film obtained in step B);
   D) curing the continuous polymer film obtained in step B) or C) to form a continuous elastomeric film; and
   E) optionally rolling the continuous elastomeric film obtained in step D) into a roll, wherein
   the cured film or elastomeric material comprises thermally reversible linkages selected from one or more of
   (i) a linkage having the structural formula

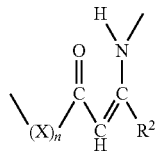

wherein: X is —O— or —NR¹—,
      n is 0 or 1,
      R¹ is hydrogen or a hydrocarbyl group, and
      R² is a hydrocarbyl group; and
   (ii) a beta-hydroxy ester linkage, wherein
      the aqueous polymer latex composition in step (B) is cast on a substrate at a preselected thickness, then cured to form the elastomeric film followed by stripping the obtained elastomeric film from the substrate; or
      the aqueous polymer latex composition is treated to promote coagulation of the latex composition, the aqueous polymer latex composition is diluted to a preselected solids content that correlates to the preselected thickness of the film, and in step (B) a heated or cooled roll is contacted with the aqueous polymer latex composition to coagulate a polymer film on the roll surface, followed by curing the film to form the elastomeric film and stripping the obtained elastomeric film from the roll; or
      the aqueous polymer latex composition is diluted to a preselected solids content that correlates to the preselected thickness of the film, a heated roll is contacted with a coagulant solution comprising multivalent cations and dried, subsequently in step (B) the heated roll is contacted with the aqueous polymer latex composition to coagulate a polymer film on the roll surface, followed by curing the film to form the elastomeric film and stripping the obtained elastomeric film from the roll; or
      by forming the elastomeric material into a continuous film by subjecting the material to a pressure of 1-20 MPa and a temperature of 40° C. to 200° C. and optionally rolling the continuous elastomeric film into a roll.

2. The method of claim 1, wherein the mixture of ethylenically unsaturated monomers for latex polymer (I) comprises:
   a) 15 to 99 wt.-% of conjugated dienes;
   b) 1 to 80 wt.-% of ethylenically unsaturated nitrile compounds;
   c) 0.05 to 10 wt.-% of ethylenically unsaturated compounds bearing functional groups (a);
   d) 0 to 80 wt.-% of vinyl aromatic monomers; and
   e) 0 to 65 wt.-% of co-polymerizable ethylenically unsaturated compounds,
   wherein monomers a) to e) are different from each other and the weight percentages being based on the total monomers in the mixture.

3. The method of claim 1, wherein the aqueous polymer latex composition comprises:
   (I) particles of a latex polymer obtained by free-radical emulsion polymerization of a mixture of ethylenically unsaturated monomers, said particles bearing a plurality of functional groups (a), and
   (II) a crosslinking component comprising a plurality of functional groups selected from functional groups (b) or a combination of functional groups (b) and (c) that are different from each other, wherein
   functional group (b) forms upon reaction with functional group (a) a thermally reversible linkage selected from one or more of
   (i) a linkage having the structural formula

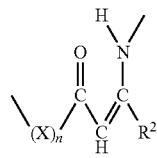

wherein: X is —O— or —NR¹—,
      n is 0 or 1,
      R¹ is hydrogen or a hydrocarbyl group, and
      R² is a hydrocarbyl group;
   and
   (ii) a beta-hydroxy ester linkage; and
   functional groups (c) on different molecules of component (II) are capable of reacting with each other.

4. The method of claim 2, wherein
a) the conjugated dienes are selected from butadiene, isoprene, 2,3-dimethyl-1,3-butadiene, 2-ethyl-1,3-butadiene, 1,3-pentadiene, myrcene, ocimene, farnesene and combinations thereof;
b) the ethylenically unsaturated nitrile compounds are selected from (meth)acrylonitrile, alpha-cyanoethyl acrylonitrile, fumaronitrile, alpha-chloronitrile and combinations thereof;
c) the ethylenically unsaturated compounds bearing functional group (a) are selected from
ethylenically unsaturated compounds bearing a functional group having the structure:

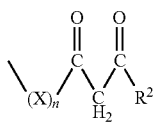

wherein X, n, $R^1$ and $R^2$ are defined;
ethylenically unsaturated compounds having a primary amino group;
ethylenically unsaturated oxirane compounds;
ethylenically unsaturated carboxylic acids and salts thereof;
ethylenically unsaturated polycarboxylic acid anhydride;
polycarboxylic acid partial ester monomers and salts thereof; and
d) the vinyl aromatic monomers are selected from styrene, alpha-methyl styrene, vinyl toluene and combinations thereof;
e) the co-polymerizable ethylenically unsaturated compounds are selected from
e1) alkyl esters of ethylenically unsaturated acids;
e2) hydroxyalkyl esters of ethylenically unsaturated acids;
e3) amides of ethylenically unsaturated acids;
e4) vinyl carboxylates;
e5) alkoxyalkyl esters of ethylenically unsaturated acids; and
the function group (b) is selected from an oxirane group, a carboxylic acid group, salt or anhydride thereof, a primary amine group and a functional group having the structure:

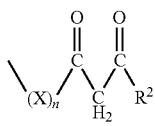

wherein X, n, $R^1$ and $R^2$ are defined.

5. The method of claim 2, wherein
the functional group (a) is a carboxylic acid group, a salt or anhydride thereof;
functional group (b) is an oxirane group, and
functional group (c) if present is selected from
silane groups bearing a plurality of silicon bonded hydroxyl groups and/or hydrolysable groups; and
ethylenically saturated groups.

6. The method of claim 2, wherein the latex polymer (I) and the crosslinking component (II) are present in relative amounts to provide a molar ratio of functional groups (b) to functional group (a) from 0.1 to 2.

7. The method of any of claim 2, wherein the crosslinking component (II) is selected from
polyoxirane functional latex particles,
polyoxirane functional monomeric or oligomeric compounds;
oxirane functional ethylenically unsaturated compounds;
oxirane functional di- or tri alkoxysilanes;
primary amino functional di- or tri alkoxysilanes.

8. The method of claim 1, wherein the latex polymer (I) has a gel content of less than 70 wt.-%.

9. The method of claim 1, wherein the aqueous polymer latex composition further comprises adjuvants selected from antifoams, wetting agents, thickeners, plasticizers, fillers, pigments, dispersants, optical brighteners, antioxidants, biocides and metal chelating agents and combinations thereof and the pH of the aqueous polymer latex composition is optionally adjusted to be in the range of 8.5 to 13.

10. The method of claim 1, wherein the elastomeric material is made from the aqueous polymer latex composition as defined.

11. A continuous elastomeric film obtainable by the method of claim 1.

12. The continuous elastomeric film of claim 11 having a thickness of 0.03 to 3.00 mm.

13. A process for making an elastomeric article by
aligning two separate continuous elastomeric films according to claim 11;
cutting the aligned continuous elastomeric films into a preselected shape to obtain two superposed layers of the elastomeric films in the preselected shape; and
joining together the superposed layers of elastomeric film at at least a preselected part of the periphery of the superposed layers to form an elastomeric article.

14. The process of claim 13, wherein the joining together is performed by using thermal means or by gluing.

15. The process of claim 13, wherein the cutting is performed by a heatable template cutting device or laser cutter, providing the preselected shape and the cutting device is heated in the sections that contact the elastomeric films where the films are joined together, thereby simultaneously cutting the elastomeric films into the preselected shape and heat sealing the preselected parts of the periphery of the superposed elastomeric films.

16. An article obtained by the process of claim 13.

17. The article of claim 16 being selected from surgical gloves, examination gloves, industrial gloves, and household gloves, single-use gloves, textile supported gloves, catheters, elastomeric sleeves and condoms.

* * * * *

UNITED STATES PATENT AND TRADEMARK OFFICE
CERTIFICATE OF CORRECTION

| | | |
|---|---|---|
| PATENT NO. | : 12,365,773 B2 | Page 1 of 1 |
| APPLICATION NO. | : 17/768703 | |
| DATED | : July 22, 2025 | |
| INVENTOR(S) | : Zhenli Wei and Yi-Fan Goh | |

It is certified that error appears in the above-identified patent and that said Letters Patent is hereby corrected as shown below:

On the Title Page

At item (57), in the Abstract at Line 5: delete "B)" and insert -- A) --.

In the Claims

In Column 26 at Line 13, Claim 7: delete "any of claim" and insert -- claim --.

Signed and Sealed this
Twenty-first Day of October, 2025

John A. Squires
*Director of the United States Patent and Trademark Office*